(12) United States Patent
Zhan et al.

(10) Patent No.: US 10,936,328 B2
(45) Date of Patent: Mar. 2, 2021

(54) TRACKING A BOOT DISK OF A COMPUTING DEVICE THROUGH ONE OR MORE REBOOTS OF THE COMPUTING DEVICE

(71) Applicant: EMC IP Holding Company LLC, Hopkinton, MA (US)

(72) Inventors: Daiqian Zhan, Austin, TX (US); Paul J. Maia, Sulphur, LA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 16/371,745

(22) Filed: Apr. 1, 2019

(65) Prior Publication Data
US 2020/0310825 A1 Oct. 1, 2020

(51) Int. Cl.
*G06F 9/00* (2006.01)
*G06F 15/177* (2006.01)
*G06F 9/4401* (2018.01)
*G06F 9/50* (2006.01)

(52) U.S. Cl.
CPC .......... *G06F 9/4408* (2013.01); *G06F 9/4416* (2013.01); *G06F 9/5061* (2013.01)

(58) Field of Classification Search
CPC .. G06F 9/4408; G06F 9/4416; G06F 9/45558; G06F 9/5061; G06F 2009/45575
See application file for complete search history.

(56) References Cited

PUBLICATIONS

Support.Microsoft.com, "Disk Drive Numbers May Not Correspond to the SATA Channel Numbers When You Install Windows on a Computer that has Multiple SATA or RAID Disks," https://support.microsoft.com/en-us/help/937251/disk-drive-numbers-may-not-correspond-to-the-sata-channel-numbers-when, Jan. 16, 2014, 7 pages.

*Primary Examiner* — Nitin C Patel
(74) *Attorney, Agent, or Firm* — Ryan, Mason & Lewis, LLP

(57) ABSTRACT

An apparatus in one embodiment comprises at least one processing device having a processor coupled to a memory. The processing device is configured to identify a given computing device that includes two or more storage devices, and to select a given one of the two or more storage devices as a boot disk for the given computing device, the given storage device being in a raw state. The processing device is also configured to write a marker to a designated region of the given storage device in the raw state, and to reboot the given computing device. The processing device is further configured to utilize the marker to identify the given storage device in the raw state as the boot disk for the given computing device subsequent to rebooting the given computing device.

20 Claims, 7 Drawing Sheets

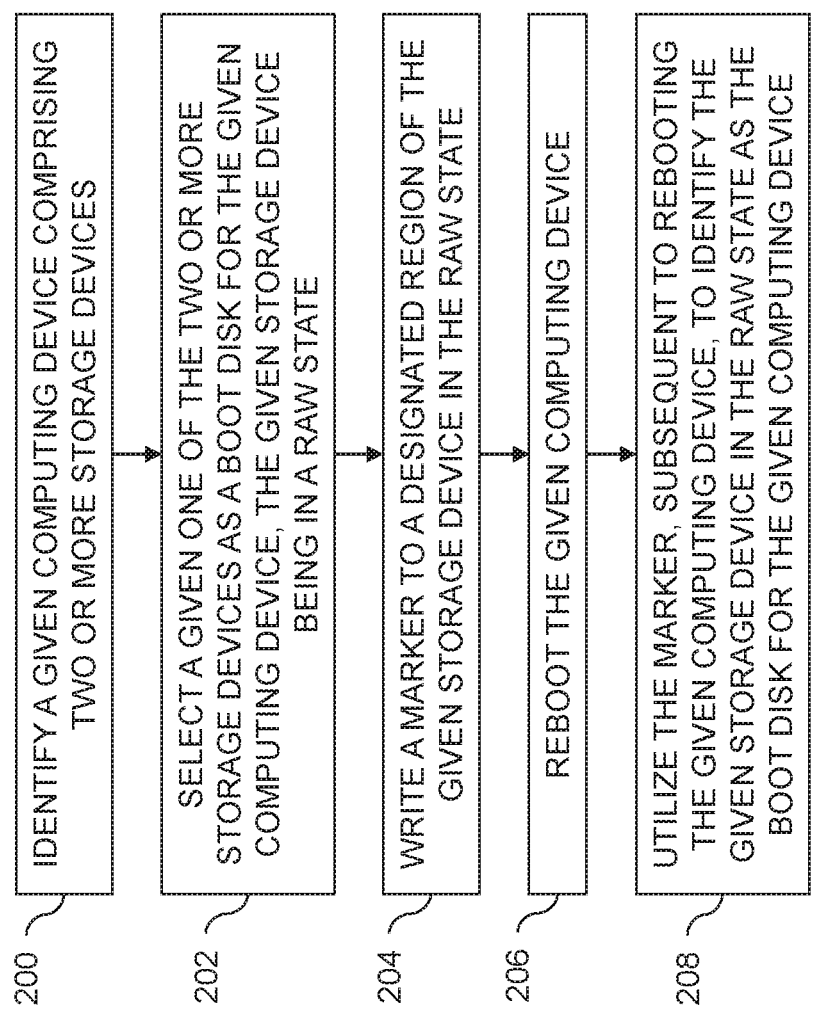

MASTER BOOT RECORD (MBR) STRUCTURE 402

| DESCRIPTION | LENGTH (BYTES) |
|---|---|
| BOOTSTRAP CODE | 446 |
| PARTITION DESCRIPTOR | 16*4 |
| SIGNATURE | 2 |
| TOTAL SIZE: 446+(16*4)+2 | 512 |

BOOT DISK MARKER 404

| | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 00000000 | 50 | 52 | 45 | 50 | 5F | 48 | 44 | 44 | 5F | 52 | 45 | 54 | 52 | 59 | 00 | 00 | PREP_HDD_RETRY |
| 00000010 | 00 | 00 | 00 | 00 | 00 | 00 | 00 | 00 | 00 | 00 | 00 | 00 | 00 | 00 | 00 | 00 | ... |
| 00000020 | 00 | 00 | 00 | 00 | 00 | 00 | 00 | 00 | 00 | 00 | 00 | 00 | 00 | 00 | 00 | 00 | ... |
| 00000030 | 00 | 00 | 00 | 00 | 00 | 00 | 00 | 00 | 00 | 00 | 00 | 00 | 00 | 00 | 00 | 00 | ... |
| ... | | | | | | | | | | | | | | | | | |
| 000001B0 | 00 | 00 | 00 | 00 | 00 | 00 | 00 | 00 | 00 | 00 | 00 | 00 | 00 | 00 | 00 | 00 | ... |
| 000001C0 | 00 | 00 | 00 | 00 | 00 | 00 | 00 | 00 | 00 | 00 | 00 | 00 | 00 | 00 | 00 | 00 | ... |
| 000001D0 | 00 | 00 | 00 | 00 | 00 | 00 | 00 | 00 | 00 | 00 | 00 | 00 | 00 | 00 | 00 | 00 | ... |
| 000001E0 | 00 | 00 | 00 | 00 | 00 | 00 | 00 | 00 | 00 | 00 | 00 | 00 | 00 | 00 | 00 | 00 | ... |
| 000001F0 | 00 | 00 | 00 | 00 | 00 | 00 | 00 | 00 | 00 | 00 | 00 | 00 | 00 | 00 | 00 | 00 | ... |

FIG. 4

TRACKING A BOOT DISK OF A COMPUTING DEVICE THROUGH ONE OR MORE REBOOTS OF THE COMPUTING DEVICE

FIELD

The field relates generally to information processing, and more particularly to configuration of computing devices.

BACKGROUND

Computing devices, such as desktop computers and laptop computers, are often configured and tested prior to deployment thereof. This may include a manufacturer of the computing devices testing and configuring different hardware components of the computing devices prior to selling or otherwise providing the computing devices to customers or other end users of the computing devices. During such testing and configuration, the computing devices may be rebooted multiple times. After a given reboot, it is possible that the disk numbering enumerated by an operating system utilized for testing and configuration of the computing devices will be re-ordered.

SUMMARY

Illustrative embodiments of the present invention provide techniques for tracking a boot disk of a computing device through one or more reboots of the computing device.

In one embodiment, an apparatus comprises at least one processing device comprising a processor coupled to a memory, wherein the processing device is configured to identify a given computing device comprising two or more storage devices, to select a given one of the two or more storage devices as a boot disk for the given computing device, the given storage device being in a raw state, to write a marker to a designated region of the given storage device in the raw state, to reboot the given computing device, and to utilize the marker, subsequent to rebooting the given computing device, to identify the given storage device in the raw state as the boot disk for the given computing device.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for tracking a boot disk through one or more reboots of a computing device in an illustrative embodiment.

FIG. 4 depicts an example of a master boot record including a boot disk marker in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
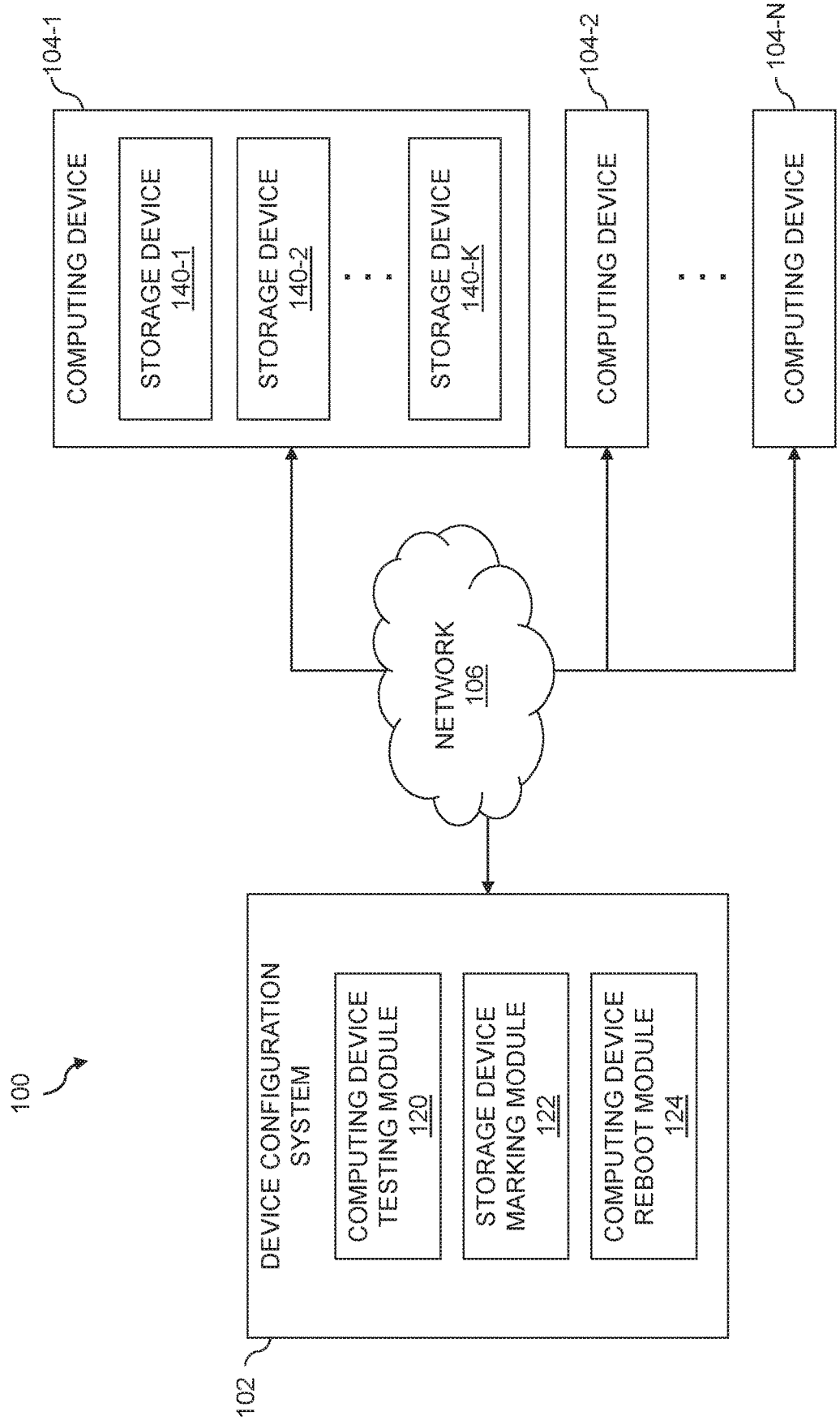
FIG. 1 is a block diagram of an information processing system for tracking a boot disk through one or more reboots of a computing device in an illustrative embodiment of the invention.

FIG. 1 shows an information processing system 100, including a device configuration system 102 and a plurality of computing devices 104-1, 104-2, . . . 104-N (collectively, computing devices 104) connected over network 106. The device configuration system 102 is assumed to be operated by an enterprise or other entity that is responsible for at least one of testing, provisioning and configuring the computing devices 104. In some embodiments, the device configuration system 102 is operated by a manufacturer of the computing devices 104, where the manufacturer seeks to test and possibly provision features of the computing devices 104 before they are sold to or provided to customers. In other embodiments, the device configuration system 102 may be operated by an enterprise, such as by an information technology (IT) division of the enterprise, where the enterprise seeks to test and provision computing devices 104 before they are placed online or otherwise utilized in an enterprise network. It should be appreciated that the device configuration system 102 may be used in a wide variety of other application scenarios.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the device configuration system 102, as well as to support communication between the device configuration system 102 and other related systems and devices not explicitly shown.

Computer systems or computing devices 104, including desktop computers, laptop computers, etc., may be configured to contain multiple storage devices (e.g., hard disk drives (HDDs), solid state drives (SSDs), etc.). Computing device 104-1, as illustrated in FIG. 1, includes multiple storage devices 140-1, 140-2, . . . 140-K (collectively, storage devices 140). Other ones of the computing devices 104 are assumed to be similarly configured with multiple storage devices (e.g., with two or more storage devices). In some embodiments, the storage devices 140 may be of different types, or with different storage capacity or other features such as different read latency, different write latency, different maximum input-output operations per second (IOPS), etc. Further, at least a subset of the storage devices 140 may be organized into one or more redundant array of independent disks (RAID) configurations.

When a computing device such as computing device 104-1 is manufactured, one of the storage devices 140 may be chosen for installing the operating system (OS) that will be utilized by an end-user of the computing device 104-1 (e.g., the customer OS). The selected storage device 140 is referred to as the "boot disk" and may be selected based on a preference of the end-user of the computer device 104-1, a logical design choice applicable for the configuration of the computer device 104-1 (e.g., an SSD may be preferable to a spinning-disk HDD), etc.

To detect the boot disk correctly, a device configuration process (e.g., run using the computing device testing module 120 of device configuration system 102) often needs to run multiple different tools to obtain information about the storage devices 140 in the computing device 104-1. For example, tools may be used to query the storage controller or storage controllers to which the storage devices 140 are attached, to determine slot numbers, commodity types, RAID configurations, etc. After the boot disk is selected, the disk number as enumerated by an OS utilized by the device configuration process, also referred to herein as a manufacturing OS, will be used throughout the process for disk preparation and customer OS installation.

When the manufacturing OS prepares (e.g., partitions and formats) the boot disk, there is a possibility for failure by the tools used to perform this function. This failure may be random. The device configuration system 102 may reboot the computing device 104-1 when such failure occurs to retry the disk preparation step, and this may often resolve the issue (e.g., as long as there is no hardware issue with the storage device 140 that is causing the failure). The device configuration process thus supports retry and reboot capability automatically on detecting failure to prepare the boot disk. However, when such a retry and reboot is executed, there is a possibility that the manufacturing OS will enumerate the storage devices 140 of the computing device 104-1 in a different order on the next boot. For this case, the disk number assigned by the manufacturing OS will now point to an incorrect disk.

If the customer OS is installed to the incorrect disk, the computing device 104-1 will either fail to boot to the customer OS during the device configuration thus causing failure of the device configuration process, or worse may ship the computer system 104-1 to the customer or other end user booting from the wrong disk. The results can vary based on the behavior of the basic input/output system (BIOS) of the computing system 104-1 for the given platform.

Consider, for example, a use case in which the computing device 104-1 includes a first storage device 140-1 that should be used as the OS install storage device (e.g., storage device 140-1 may be a fast but relatively small 256 gigabyte (GB) non-volatile memory express (NVME) SSD storage device) and a second storage device 140-2 that should be used as a data storage device (e.g., storage device 140-2 may be a large but comparably slow 2 terabyte (TB) spinning-disk HDD). If the device configuration process installs the customer OS to the 2 TB spinning disk HDD 140-2 rather than the 256 GB NVME SSD 140-1, the computing system 104-1 may function but not by design or desire resulting in poor performance.

There is thus a need for being able to guarantee that the identity of the boot disk selected during an initial boot disk analysis logic of the manufacturing OS during a device configuration process is correctly retained across reboots during the device configuration process. This is particularly important in the context of reboots which occur during initial disk preparation, where failure of the device configuration process does not leave the boot disk in an identifiable state. Illustrative embodiments provide techniques for tracking the boot disk through reboots in the device configuration process. Advantageously, some embodiments retain logic abstraction and provide autonomous, quick and reliable solutions.

The device configuration system 102 includes a computing device testing module 120, a storage device marking module 122, and a computing device reboot module 124. The computing device testing module 120 is configured to identify a given one of the computing devices 104 that comprises two or more storage devices. This may include identifying the given computing device 104 as one that is to be configured or tested by the device configuration system 102. Such configuration, for example, may include installing or provisioning a customer OS on the given computing device 104. The computing device testing module 120 is further configured to select a given one of the two or more storage devices of the given computing device 104 as a boot disk for the given computing device 104. It is assumed that the selected or given storage device is in a "raw" state (e.g., that the given storage device does not have a master boot record (MBR), formatting data, partitions, etc. set up).

The computing device testing module 120 is further configured to perform one or more tests on the given computing device 104, or to provision or otherwise configure one or more aspects of the given computing device 104. Such provisioning may include preparing the given storage device of the given computing device 104 for deployment of the customer OS. If the preparation of the given storage device of the given computing device 104 fails, or if the given computing device 104 as part of its testing or other configuration needs to be rebooted while the given storage device is still in the raw state, the storage device marking module 122 is configured to write a marker to a designated region of the given storage device that is in the raw state. This may involve, for example, writing a designated sequence of data that identifies the given storage device of the given computing device 104 to the device configuration system 102 as the boot disk after reboot of the given computing device 104. The designated region of the given storage device may be an area of the given storage device which would be reserved for the MBR.

The computing device reboot module 124 is configured to reboot the given computing device 104 after writing the marker to the given storage device thereof that is in the raw state. The computing device reboot module 124 is further configured to utilize the marker, subsequent to rebooting the given computing device 104, to identify the given storage device in the raw state as the boot disk for the given computing device 104. The computing device testing module 120 may then proceed with resuming the testing or configuration of the given computing device 104, such as retrying the disk preparation process for the given storage device thereof.

In some embodiments, the computing devices 104 comprise respective computers associated with a particular company, organization or other enterprise. In addition, at least portions of the system 100 may also be referred to herein as collectively comprising an "enterprise." For example, the device configuration system 102 as noted above may be operated by an IT division or department of the enterprise for testing, provisioning and configuring the computing devices 104 on its enterprise network. This may include remotely testing, provisioning and configuring the computing devices 104, such as using network boots to prepare and install a customer OS on the different computing devices 104. The customer OS in some cases may be one that is used to configure at least a subset of the computing devices 104 as a data center, cloud infrastructure, etc. Numerous other operating scenarios involving a wide variety of different types and arrangements of processing nodes are possible, as will be appreciated by those skilled in the art.

Although not shown in FIG. 1, the device configuration system 102 may include or be coupled to a data store configured to store and record information related to the progress of the configuration and testing of computing devices 104 (e.g., to persist the configuration process state prior to rebooting one or more of the computing devices 104). The data store may also store files, tools, etc. needed for the configuration and testing of the computing devices 104. The data store in some embodiments is implemented using one or more storage systems or devices associated with the device configuration system 102. In some embodiments, one or more of the storage systems utilized to implement the data store comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

It is to be appreciated that the particular arrangement of the device configuration system 102 and computing devices 104 illustrated in the FIG. 1 embodiment is presented by way of example only, and alternative arrangements can be used in other embodiments. For example, the functionality associated with the computing device testing module 120, the storage device marking module 122 and the computing device reboot module 124 may be combined into one module, or separated across more than three modules with the multiple modules possibly being implemented with multiple distinct processors or processing devices.

At least portions of the computing device testing module 120, the storage device marking module 122 and the computing device reboot module 124 may be implemented at least in part in the form of software that is stored in memory and executed by a processor.

It is to be understood that the particular set of elements shown in FIG. 1 for tracking boot disks through one or more reboots of the computing devices 104 is presented by way of illustrative example only, and in other embodiments additional or alternative elements may be used. Thus, another embodiment may include additional or alternative systems, devices and other network entities, as well as different arrangements of modules and other components.

The device configuration system 102 and other portions of the system 100, as will be described in further detail below, may be part of cloud infrastructure such as an Amazon Web Services (AWS) system. Other examples of cloud-based systems that can be used to provide the device configuration system 102 include Virtustream Enterprise Cloud, Virtustream Storage Cloud, Google Cloud Platform (GCP) and Microsoft Azure.

The device configuration system 102 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The device configuration system 102 or components thereof (e.g., computing device testing module 120, storage device marking module 122 and computing device reboot module 124) may be implemented on respective distinct processing platforms, although numerous other arrangements are possible. For example, in some embodiments at least portions of the computing device testing module 120, storage device marking module 122 and computing device reboot module 124 may be implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different components of the device configuration system 102 (e.g., computing device testing module 120, storage device marking module 122 and computing device reboot module 124) to reside in different data centers. Numerous other distributed implementations are possible.

Additional examples of processing platforms utilized to implement the device configuration system 102 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for tracking a boot disk of a computing device through one or more reboots of the computing device will now be described in more detail with reference to the flow diagram of FIG. 2. It is to be understood that this particular process is only an example, and that additional or alternative processes for tracking a boot disk of a computing device through one or more reboots of the computing device can be carried out in other embodiments.

In this embodiment, the process includes steps 200 through 208. These steps are assumed to be performed by the device configuration system 102 utilizing computing device testing module 120, storage device marking module 122 and computing device reboot module 124. The process begins with step 200, identifying a given computing device comprising two or more storage devices. The given computing device may be one that is to be configured or tested by another device or system (e.g., by device configuration system 102). The given computing device may be one that is to be prepared for installation of an end-user or customer OS.

In step 202, a given one of the two or more storage devices of the given computing device is selected as a boot disk for the given computing device. The given storage device is assumed to be in a raw state, wherein the given storage device is missing or not configured with an MBR, formatting data, one or more partitions, etc. The process continues with step 204, writing a marker to a designated region of the given storage device in the raw state. The designated region of the given storage device may comprise an area of the given storage device designated for use as the MBR. The marker written to the designated region of the given storage device in the raw state may comprise a designated sequence of data identifying the given storage device as the boot disk for the given computing device, such as a human-readable string indicating that the given storage device is to be utilized as the boot disk for the given computing device. Step 204 may be responsive to determining that disk preparation of the given storage device has failed less than a designated threshold number of times.

In step 206, the given computing device is rebooted. Step 206 may include utilizing a network boot to reboot the given computing device. Rebooting the given computing device in step 206 may comprise cleaning the given storage device, removing any markers identifying other ones of the two or more storage devices as the boot disk for the given computing device from the other ones of the two or more storage devices, writing the marker to the designated region of the given storage device in the raw state, and rebooting the given computing device. In some embodiments, step 206 includes incrementing a counter identifying a number of retry attempts for preparing the given storage device as the boot disk for the given computing device. Step 206 may also include persisting a state of a process for preparing the given storage device as the boot disk for the given computing device.

The process continues with step 208, utilizing the marker, subsequent to rebooting the given computing device, to identify the given storage device in the raw state as the boot disk for the given computing device. Step 208 may include determining whether a previous attempt to configure the boot disk for the given computing device failed and, responsive to determining that the previous attempt to configure the boot disk for the given computing device failed, searching the two or more storage devices of the given computing device for the marker. Utilizing the marker to identify the given storage device in the raw state as the boot disk for the given computing device in step 208 may comprise assigning a disk number of the given storage device to a process variable identifying the boot disk.

To more accurately track the selected boot disk (e.g., a boot disk with a RAW file system) between reboots in the manufacturing or device configuration process, some embodiments utilize a marking scheme that adds an identifier string to the area of the boot disk that is normally reserved for the MBR (e.g., Sector 0). The marker is added to the reserved MBR area on the selected boot disk, and the manufacturing or device configuration process uses the marker to track the boot disk even though the boot disk may be in a RAW state (e.g., with no MBR, format data, partitions, etc. set up on the boot disk). The marker remains on the boot disk (e.g., until after the next reboot, at which point the marker may be removed) and allows the boot disk to be tracked independent of the way that the manufacturing OS re-enumerates the storage devices of a computing device in subsequent reboots. The marker may be written to the boot disk's MBR area using a tool written using OS-level library calls. Advantageously, the tool and marker may be generic to the OS application regardless of the disk bus types, RAID or non-RAID configuration of storage devices, storage device vendors, storage controllers, etc.

Figure 3A:
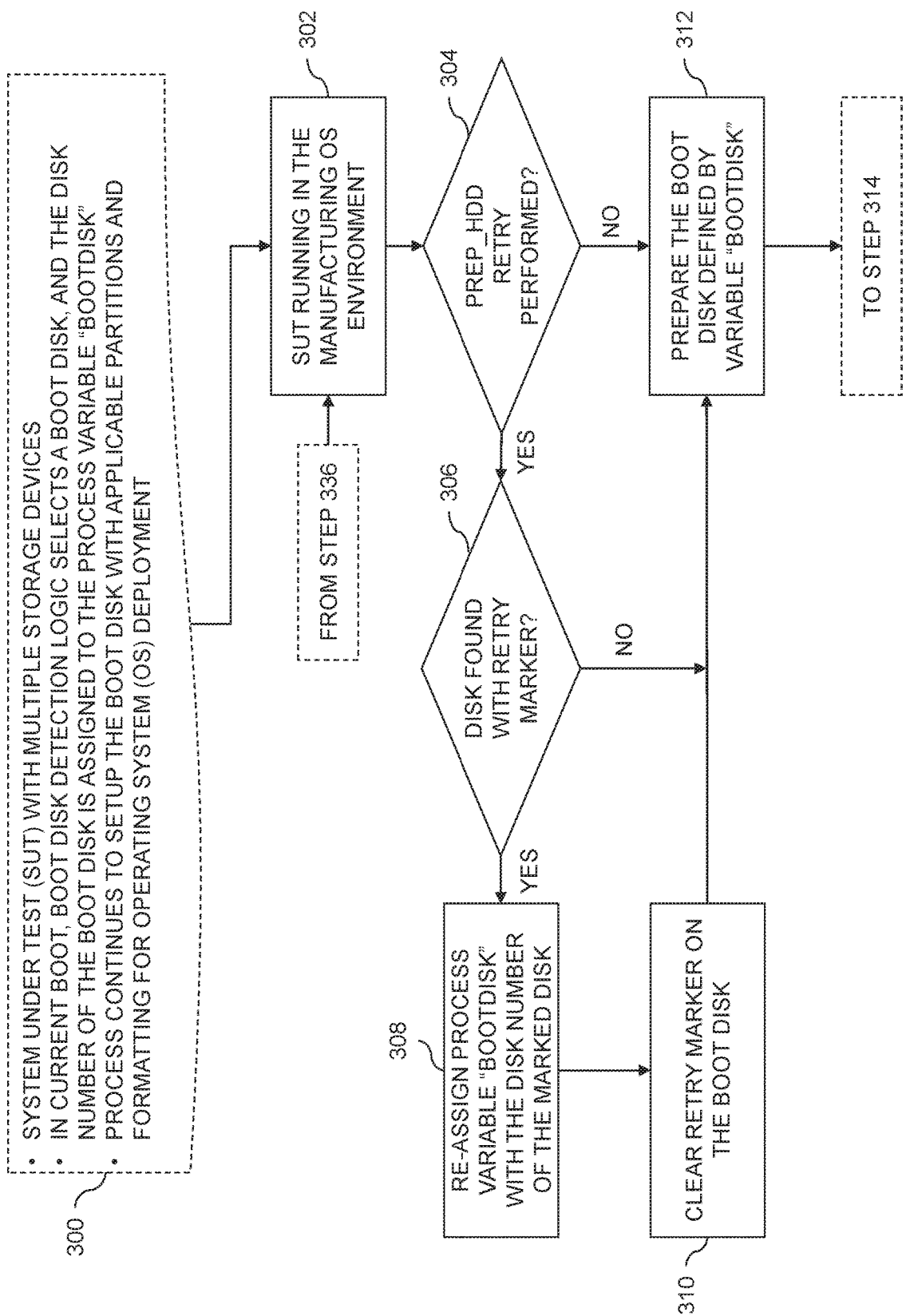
FIGS. 3A and 3B depict a flow diagram of an exemplary process for tracking a boot disk through reboots in a device configuration process in an illustrative embodiment.
Figure 3B:
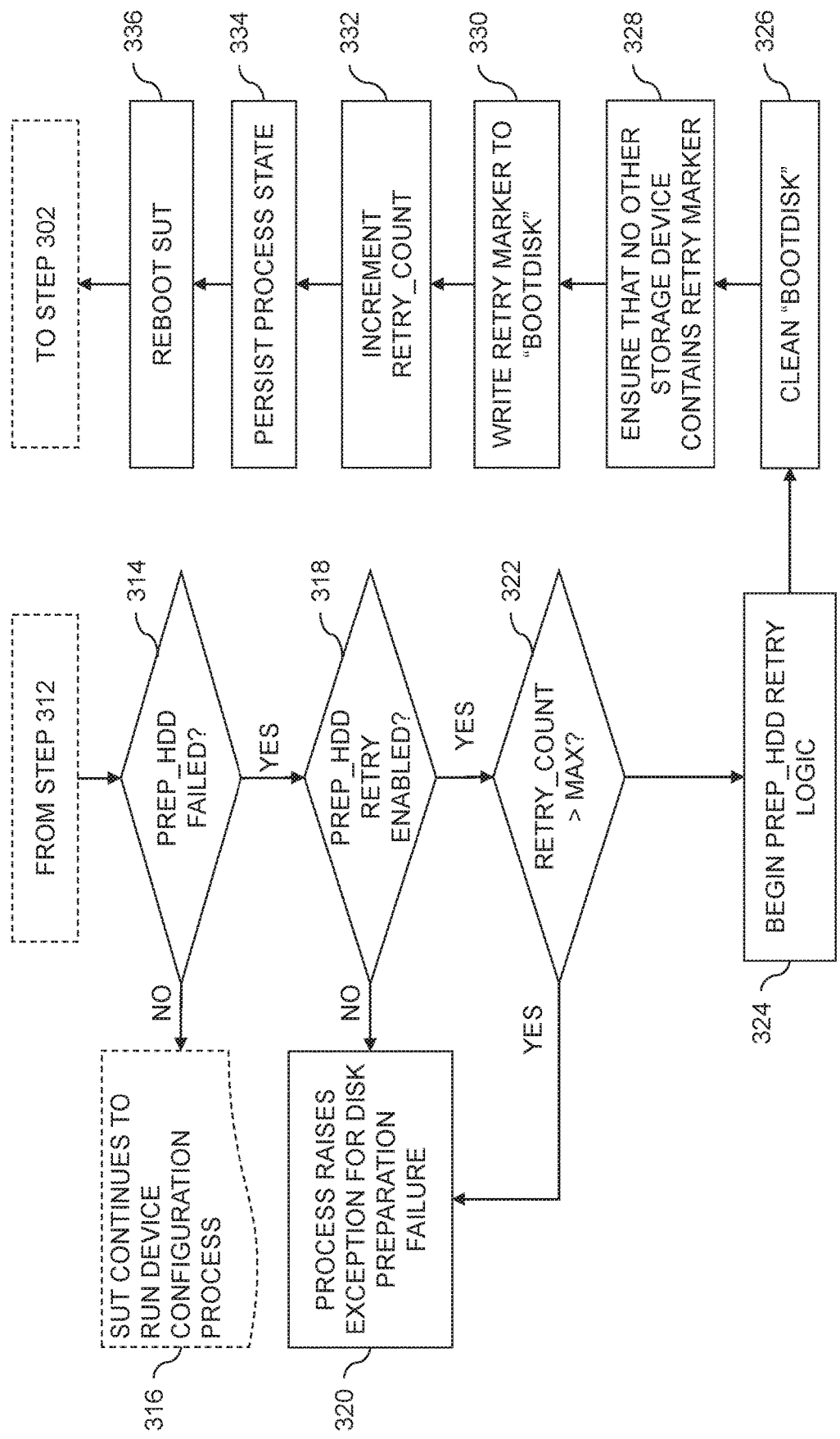

FIGS. 3A and 3B show a device configuration process flow that tracks a boot disk through reboots in the device configuration process. As a prerequisite 300, it is assumed that a particular computing device, referred to as a system under test (SUT), is configured with multiple storage devices. The OS boot disk (e.g., as determined by a manufacturing OS utilized during the device configuration process) is determined by a complex set of rules, which may be based at least in part on the customer or end-user order or request, information returned by the various tools utilized to identify the various storage devices of the SUT, etc. The disk number for the selected boot disk, as enumerated by the manufacturing OS, is recorded in a device configuration process environment variable (e.g., "BOOTDISK") for consumption throughout the device configuration process. The device configuration process needs to initialize the boot disk with partitions and formatting to prepare for customer OS deployment.

A factory or manufacturing process in some embodiments may run on a SUT that is configured with a processor, memory, storage devices, a network interface card (NIC), and possibly other boot media such as universal serial bus (USB), etc. The factory or manufacturing process can control the boot sequence in the system BIOS, so as to switch between different types of boots (e.g., between a HDD or other storage device boot and NIC/PXE boot if applicable). Normally, before the selected boot disk is set up with OS partitions and content and the SUT is switched to a HDD boot, the SUT is booted up with the manufacturer OS using NIC/PXE boot media. The storage device could be various types or external controllers configured for the system. Thus, during the manufacturing or other device configuration process, the NIC of the SUT may be used to PXE boot up the SUT to run the process, and also connect to factory content servers or other data stores. If the SUT does not have a NIC, another option is to use a USB boot as an alternative (e.g., possibly using a USB NIC dongle to access the content servers or other data stores).

It is assumed in the processing flow shown in FIGS. 3A and 3B that a random failure occurs and the attempt to prepare the boot disk fails on some function. Thus, the device configuration process needs to clean the boot disk and reboot the SUT to retry the disk preparation logic. The device configuration process may utilize Preboot eXecution Environment (PXE) to boot and reboot the SUT over a network. Since the disk numbering of the storage devices in the SUT (e.g., as enumerated by the manufacturing OS) may change following the reboot, the device configuration process tracks the boot disk by writing a marker (e.g., "PREP_HDD_RETRY") to the boot disk. In some embodiments, the marker is written to an MBR area of the boot disk. This marker in the MBR area will stay with the disk through the reboot regardless of any re-enumeration of the boot disk's ordering within the manufacturing OS.

FIG. 4 shows an example MBR structure 402 along with an example of a boot disk marker 404 written to a designated area (e.g., Sector 0) reserved for the MBR structure 402. In the FIG. 4 example, it is assumed that the marker represents a human-readable string (e.g., "PREP_HDD_RETRY") which makes debugging easier. The marker, however, may represent any arbitrary string that is recognizable by the device configuration process as corresponding to a boot disk marker. Further, although FIG. 4 shows the marker written to the MBR area of the boot disk, it should be appreciated that as the boot disk in some embodiments is assumed to be in RAW format, there may not be an actual MBR present on the boot disk. If an MBR were present, this may cause difficulties in the network boot (e.g., PXE boot) of the SUT, as the BIOS of the SUT may try to boot from the boot disk if the MBR is present. More generally, the boot disk marker may be written to any designated region or portion of the boot disk, so long as the device configuration process is programmed to search that designated area or portion for the boot disk marker on reboot of the SUT.

Referring back to FIG. 3, in step 302 the SUT is assumed to be running in the manufacturing OS environment (e.g., after a PXE boot of the SUT over a network). In step 304, a determination is made as to whether the SUT has undergone a previous boot and attempt to configure the boot disk (e.g., a "PREP_HDD" process). If the result of determination 304 is yes, the device configuration process in step 306 determines whether a storage device or disk is found with a retry marker. After the SUT boots back to the device configuration process (e.g., using the manufacturing OS with PXE), the device configuration process can definitively locate the disk that contains the marker as the marker is assumed to be written to a designated area of the boot disk (e.g., an area of the boot disk reserved for the MBR as shown in FIG. 4).

If a storage device with the marker is found in step 306, the process variable "BOOTDISK" is re-assigned to the disk number of the storage device with the marker in step 308. The retry marker (e.g., "PREP_HDD_RETRY") is then cleared from the boot disk in step 310 so that the storage device is fully RAW and ready for disk preparation, and the process continues with step 312. If no storage device with the marker is found in step 306, the process continues with step 312 bypassing steps 308 and 310. This may occur if there is an error in writing the marker to the boot disk in a previous boot of the SUT, or if no marker has previously been written to any of the storage devices in the SUT.

In step 312, the device configuration process attempts to prepare the boot disk defined by the variable "BOOTDISK." In step 314, a determination is made as to whether preparation of the boot disk (e.g., "PREP_HDD") has failed. If preparation of the boot disk is successful, the device configuration process continues with step 316 where the SUT continues to run the device configuration process (e.g., to install a customer OS thereto, to otherwise test and prepare the SUT for deployment, etc.). Before the boot disk is successfully prepared, booting the SUT using a network boot (e.g., using PXE) may be considered "expensive" in terms of the time it takes (e.g., in the range of 3 to 4 minutes). Booting directly from the boot disk, however, may be significantly faster (e.g., in the range of 30 seconds for SSD boot disks). It is thus desirable to boot the SUT from the boot disk rather than over the network for subsequent testing and configuration in step 316, even in cases where the SUT is to be deployed or delivered without a customer OS installed thereon.

If the determination in step 314 indicates that preparation of the boot disk (e.g., "PREP_HDD") has failed, the process continues with step 318, where a determination is made as to whether retry of the preparation of the boot disk is enabled. If the result of the step 318 determination is no, the device configuration process continues to step 320, where an exception is raised for disk preparation failure. If the result of the step 316 determination is yes, the process proceeds with determining whether the retry count exceeds a maximum number of retries in step 322. If the retry count exceeds the maximum number of retries, the process proceeds to step 320. If the retry count does not exceed the maximum number of retries, the process proceeds to step 324 and the logic for retrying the boot disk preparation is initiated. The maximum number of retries for boot disk preparation may be a parameter that is selected by an operator that performs the device configuration process. For example, in some embodiments the maximum number of retries may be 5. It should be appreciated, however, that in other embodiments different values for the maximum number of retries may be utilized.

The boot disk preparation retry logic (e.g., "PREP_HDD retry") includes steps 326 through 336. In step 326, the boot disk is cleaned to remove any formatting thereon to return the boot disk to the RAW state. The device preparation process in step 328 then ensures that no other storage device in the SUT contains a retry marker. If any such storage devices are found, the retry markers thereon may be removed. In step 330, the retry marker (e.g., "PREP_HDD_RETRY") is written to the boot disk. As described above, the marker may be written to a designated area of the boot disk (e.g., to Sector 0 of an area of the boot disk reserved for the MBR) and may include a designated string that is recognizable by the device configuration process as corresponding to the retry marker. The device configuration process in step 332 then increments the retry counter (e.g., "RETRY_COUNT"). The process state of the device configuration process is persisted in step 334, and the SUT is rebooted in step 336. The device configuration process then returns to step 302, and the process is repeated until the disk preparation process is successful (e.g., the process moves to step 316) or the retry count exceeds the maximum (e.g., the process moves to step 320).

Device configuration processes, as noted above, may use a manufacturing OS that includes logic to detect the disk enumeration order each time the SUT boots into the manufacturing OS by checking for the existence of a primary partition label (e.g., "OS" or Extensible Firmware Interface (EFI) system partition). In certain failure cases, however, such partitions have not been successfully set up on the RAW boot disk, and thus cannot be tracked between reboots. Illustrative embodiments utilize a retry marker as described above to enable definitive tracking of a selected RAW boot disk, where the manufacturing OS may re-order the disk numbers on reboot of the SUT.

In some embodiments, the tool utilized by the device configuration process to put the marker on the RAW boot disk is OS-level code based, which can generically work on storage devices across different drive bus types, RAID or non-RAID configurations, vendors, storage controllers, etc. Boot disk marking as described herein also avoids additional complexity in the device configuration process, retaining logic abstraction and providing a quick, autonomous and reliable solution.

Implementation of boot disk marking as described herein allows for a reduction in failures during the device configuration process as well as improvements to the customer or other end-user experience be ensuring that the customer OS is installed onto the desired storage device of a computing system. Further, boot disk marking may be used in additional applications in the device configuration or manufacturing process, and are not limited solely to use in correctly selecting the boot disk after a reboot of the SUT due to failure in preparation of the boot disk.

To track the boot disk across reboots of the SUT, one option is to keep track of a serial number of the determined boot disk. The serial number of the boot disk may provide a unique identifier for each storage device, and some OS tools (e.g., Windows Management Instrumentation Command line (WMIC) in Windows, Ishblk/Ishw/hdparm in Linux, etc.) can retrieve the serial number for each disk enumerated by the manufacturing OS. However, if the boot disk is put into a RAID container or configuration, no serial number is available and thus use of the serial number is not a 100% coverage solution.

Another option for tracking the boot disk across reboots of the SUT is to re-run an initial boot disk detection logic to re-detect the correct boot disk after retry and reboot logic restarts the SUT. The initial boot disk detection logic, however, may be cumbersome (e.g., it may require running various different disk, RAID, storage controller tools, etc.) and time consuming to the operator of the device configuration process (e.g., cost to burn cycle time). For example, log analysis shows that it may take between 34 and 54 seconds to complete the initial boot disk detection logic on a Workstation Desktop system. If the SUT needs to be rebooted several times, the cost for re-running the initial boot disk detection logic can therefore be costly, particularly as the number of computing devices to be configured increases. With the boot disk tracking methods described herein, there is no need to re-run the initial boot disk detection logic. In the failure case that causes the boot disk tracking method to be considered, the initial boot disk detection logic has already run in an earlier phase of the device configuration process. To re-run the initial boot disk detection logic can therefore require potentially fragile dependencies between different groups and phases of a device configuration process including significant re-write of the code to implement such a solution.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for tracking a boot disk of a computing device through one or more reboots of the computing device will now be described in greater detail with reference to FIGS. 5 and 6. Although described in the context of system 100, these platforms may also be used to implement at least portions of other information processing systems in other embodiments.

Figure 5:
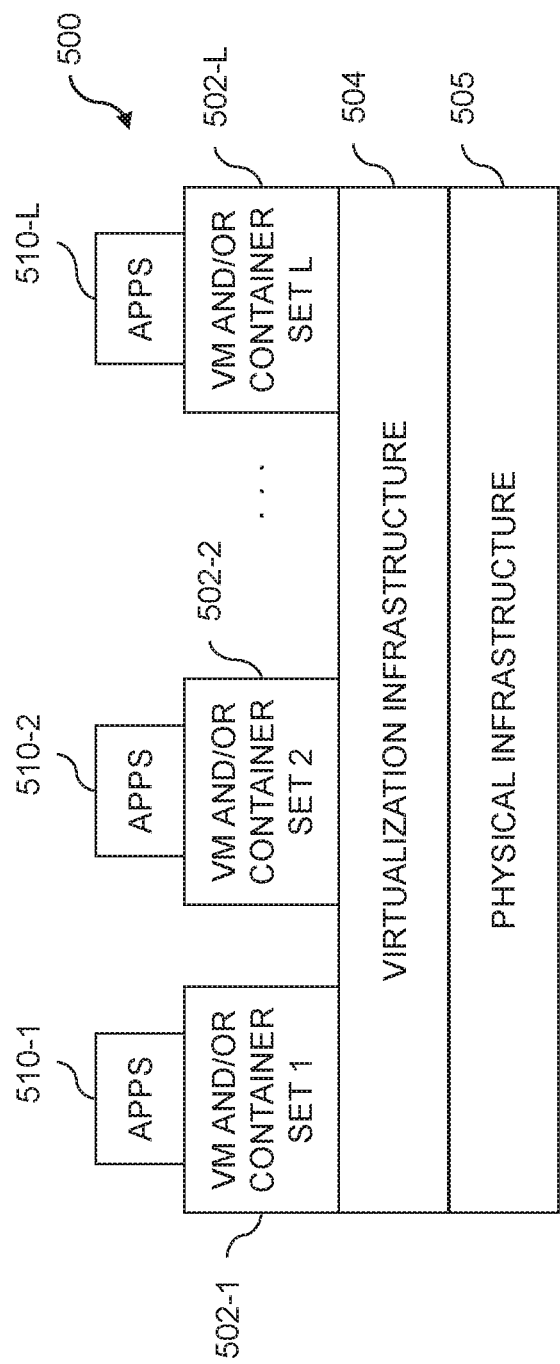
FIGS. 5 and 6 show examples of processing platforms that may be utilized to implement at least a portion of an information processing system in illustrative embodiments.
Figure 6:
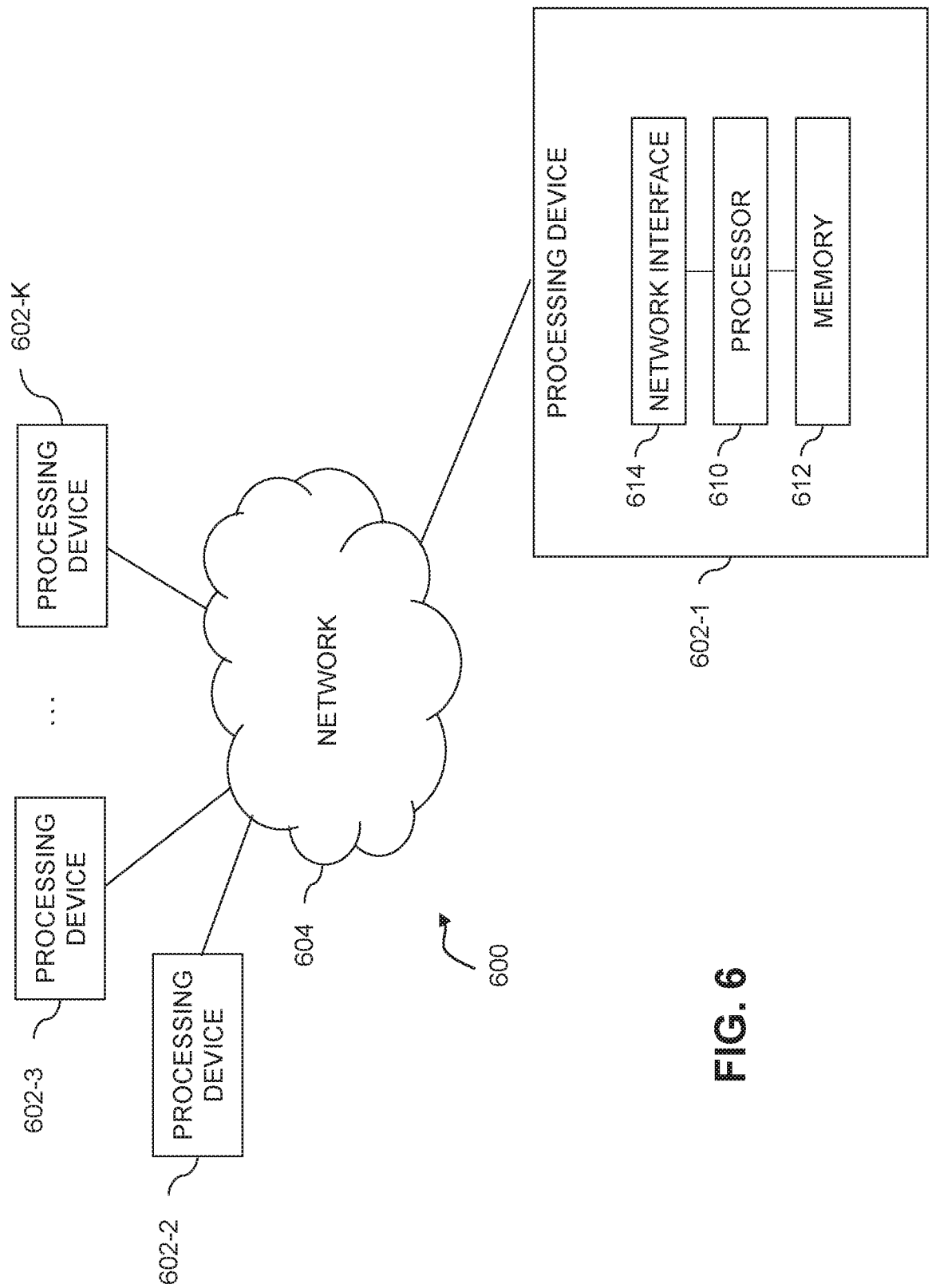

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for tracking a boot disk of a computing device through one or more reboots of the computing device as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage devices, markers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   wherein the processing device is configured:
   to identify a given computing device comprising two or more storage devices;
   to select a given one of the two or more storage devices as a boot disk for the given computing device, the given storage device being in a raw state;
   to write a marker to a designated region of the given storage device in the raw state;
   to reboot the given computing device; and
   to utilize the marker, subsequent to rebooting the given computing device, to identify the given storage device in the raw state as the boot disk for the given computing device.

2. The apparatus of claim 1 wherein identifying the given computing device comprises determining that the given computing device is to be at least one of configured and tested by the at least one processing device.

3. The apparatus of claim 1 wherein identifying the given computing device comprises determining that the given computing device is to be prepared for installation of an end-user operating system.

4. The apparatus of claim 1 wherein the raw state of the given storage device comprises a state in which the given storage device is missing a master boot record, formatting data and one or more partitions.

5. The apparatus of claim 1 wherein the designated region of the given storage device comprises an area of the given storage device designated for use as a master boot record.

6. The apparatus of claim 1 wherein the marker written to the designated region of the given storage device in the raw state comprises a designated sequence of data identifying the given storage device as the boot disk for the given computing device.

7. The apparatus of claim 6 wherein the designated sequence of data comprises a human-readable string indicating that the given storage device is to be utilized as the boot disk for the given computing device.

8. The apparatus of claim 1 wherein writing the marker to the designated region of the given storage device in the raw state is responsive to determining that disk preparation of the given storage device has failed less than a designated threshold number of times.

9. The apparatus of claim 1 wherein rebooting the given computing device comprises utilizing a network boot to reboot the given computing device.

10. The apparatus of claim 1 wherein rebooting the given computing device comprises:
    cleaning the given storage device;
    removing any markers identifying other ones of the two or more storage devices as the boot disk for the given computing device from the other ones of the two or more storage devices;
    writing the marker to the designated region of the given storage device in the raw state; and
    rebooting the given computing device.

11. The apparatus of claim 10 wherein rebooting the given computing device further comprises incrementing a counter identifying a number of retry attempts for preparing the given storage device as the boot disk for the given computing device.

12. The apparatus of claim 10 wherein rebooting the given computing device further comprises persisting a state of a process for preparing the given storage device as the boot disk for the given computing device.

13. The apparatus of claim 1 wherein utilizing the marker to identify the given storage device in the raw state as the boot disk for the given computing device comprises:
    determining whether a previous attempt to configure the boot disk for the given computing device failed; and
    responsive to determining that the previous attempt to configure the boot disk for the given computing device failed, searching the two or more storage devices of the given computing device for the marker.

14. The apparatus of claim 1 wherein utilizing the marker to identify the given storage device in the raw state as the boot disk for the given computing device comprises assigning a disk number of the given storage device to a process variable identifying the boot disk.

15. A method comprising:
    identifying a given computing device comprising two or more storage devices;
    selecting a given one of the two or more storage devices as a boot disk for the given computing device, the given storage device being in a raw state;
    writing a marker to a designated region of the given storage device in the raw state;
    rebooting the given computing device; and
    utilizing the marker, subsequent to rebooting the given computing device, to identify the given storage device in the raw state as the boot disk for the given computing device;
    wherein the method is performed by at least one processing device comprising a processor coupled to a memory.

16. The method of claim 15 wherein the designated region of the given storage device comprises an area of the given storage device designated for use as a master boot record.

17. The method of claim 15 wherein the marker written to the designated region of the given storage device in the raw state comprises a designated sequence of data identifying the given storage device as the boot disk for the given computing device.

18. A computer program product comprising a non-transitory processor-readable storage medium having stored therein program code of one or more software programs, wherein the program code when executed by at least one processing device causes the at least one processing device:
    to identify a given computing device comprising two or more storage devices;
    to select a given one of the two or more storage devices as a boot disk for the given computing device, the given storage device being in a raw state;
    to write a marker to a designated region of the given storage device in the raw state;
    to reboot the given computing device; and
    to utilize the marker, subsequent to rebooting the given computing device, to identify the given storage device in the raw state as the boot disk for the given computing device.

19. The computer program product of claim 18 wherein the designated region of the given storage device comprises an area of the given storage device designated for use as a master boot record.

20. The computer program product of claim 18 wherein the marker written to the designated region of the given storage device in the raw state comprises a designated sequence of data identifying the given storage device as the boot disk for the given computing device.

* * * * *